US012317046B2

(12) United States Patent
Tong et al.

(10) Patent No.: US 12,317,046 B2
(45) Date of Patent: *May 27, 2025

(54) DOUBLE-SIDED SPEAKER

(71) Applicant: ShenZhen Luxshare Acoustics Technology Ltd., Shenzhen (CN)

(72) Inventors: ZhiHua Tong, Shenzhen (CN); Chih-Kai Sun, Taipei (TW)

(73) Assignee: SHENZHEN LUXSHARE ACOUSTICS TECHNOLOGY LTD., Shenzhen (CN)

( * ) Notice: Subject to any disclaimer, the term of this patent is extended or adjusted under 35 U.S.C. 154(b) by 328 days.

This patent is subject to a terminal disclaimer.

(21) Appl. No.: 17/989,241

(22) Filed: Nov. 17, 2022

(65) Prior Publication Data

US 2023/0224641 A1 Jul. 13, 2023

(30) Foreign Application Priority Data

Jan. 7, 2022 (CN) ......................... 202210015616.0

(51) Int. Cl.

*H04R 9/02* (2006.01)
*H04R 9/04* (2006.01)
*H04R 9/06* (2006.01)

(52) U.S. Cl.

CPC ............... *H04R 9/025* (2013.01); *H04R 9/04* (2013.01); *H04R 9/06* (2013.01); *H04R 2209/041* (2013.01)

(58) Field of Classification Search

CPC . H04R 9/025; H04R 9/04; H04R 9/06; H04R 2209/041; H04R 9/045;

(Continued)

(56) References Cited

U.S. PATENT DOCUMENTS 9,736,591 B2 8/2017 Van Halteren et al.
12,200,461 B2 * 1/2025 Zeng ...................... H04R 9/025

(Continued)

FOREIGN PATENT DOCUMENTS

CN 109788406 B 9/2020
CN 111698618 A 9/2020

(Continued)

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

A double-sided speaker, comprising a combination of magnetic conductive carrying plate with a side magnetic conductive member (or a magnetic conductive carrying plate component), a first magnetic circuit module, a second magnetic circuit module, a first voice coil, a second voice coil, a first vibrating component, and a second vibrating component. The magnetic conductive carrying plate comprises two sidewalls and a bottom plate. The two sidewalls are disposed at two side edges of a side surface of the bottom plate. The side magnetic conductive member is disposed on two side edges of another side surface of the bottom plate. The first magnetic circuit module is disposed at one side of the magnetic conductive carrying plate. The second magnetic circuit module is disposed at another side of the magnetic conductive carrying plate. The first voice coil is disposed between the first magnetic circuit module and the sidewall.

30 Claims, 12 Drawing Sheets

(58) Field of Classification Search
CPC ........ H04R 9/046; H04R 7/04; H04R 1/2811; H04R 2209/022; H04R 2209/024; H04R 5/02; H04R 2400/11; H04R 1/025
See application file for complete search history.

(56) References Cited

U.S. PATENT DOCUMENTS

| | | | | |
|---|---|---|---|---|
| 2020/0275213 | A1 | 8/2020 | Cho et al. | |
| 2023/0224640 | A1* | 7/2023 | Zeng ...................... | H04R 9/025 381/182 |
| 2023/0232156 | A1* | 7/2023 | Tong ...................... | H04R 9/025 381/182 |

FOREIGN PATENT DOCUMENTS

| | | | |
|---|---|---|---|
| CN | 112514417 | A | 3/2021 |
| CN | 213586267 | U | 6/2021 |
| CN | 214591964 | U | 11/2021 |
| CN | 214851804 | U | 11/2021 |
| CN | 216531781 | U | 5/2022 |
| TV | M628818 | U | 6/2022 |
| TW | 201016039 | A1 | 4/2010 |
| TW | M610965 | U | 4/2021 |
| TW | M615881 | U | 8/2021 |
| TW | I741928 | B | 10/2021 |
| TW | I751069 | B | 12/2021 |
| TW | M628819 | U | 6/2022 |
| WO | WO 2020/181892 | A1 | 9/2020 |

* cited by examiner

DOUBLE-SIDED SPEAKER

CROSS-REFERENCE TO RELATED APPLICATION

This application claims the priority benefit of Chinese Patent Application Serial Number 202210015616.0, filed on Jan. 7, 2022, the full disclosure of which is incorporated herein by reference.

BACKGROUND

Technical Field

The present disclosure relates to the technical field of speaker devices, particularly to a double-sided speaker.

Related Art

In the prior art, a double-sided speaker is usually formed by two voice coils with a common magnetic circuit module. The interior of the double-sided speaker is divided into two resonance spaces by the magnetic circuit module. The two voice coils are respectively in the two resonance spaces which are not interconnected, so the sound quality of the double-sided speaker tends to be poor. Improving the sound quality of the double-sided speaker by increasing the resonance space would have the size of the double-sided speaker to be increased, which is not suitable for thin electronic devices.

SUMMARY

The embodiments of the present disclosure provide a double-sided speaker tended to solve the problem of poor sound quality.

The present disclosure provides a double-sided speaker, comprising a magnetic conductive carrying plate, a side magnetic conductive member, a first magnetic circuit module, a second magnetic circuit module, a first voice coil, a second voice coil, a first vibrating component, and a second vibrating component. The magnetic conductive carrying plate comprises two sidewalls and a bottom plate. The two sidewalls are disposed at two side edges of a side surface of the bottom plate. The side magnetic conductive member is disposed on two side edges of another side surface of the bottom plate. The first magnetic circuit module is disposed at one side of the magnetic conductive carrying plate. The second magnetic circuit module is disposed at another side of the magnetic conductive carrying plate. The first voice coil is disposed between the first magnetic circuit module and the sidewall. The second voice coil is disposed between the second magnetic circuit module and the side magnetic conductive member. The first vibrating component is disposed at one side of the magnetic conductive carrying plate and comprises a first accommodating space in which the first magnetic circuit module and the first voice coil are disposed. The second vibrating component is disposed at another side of the magnetic conductive carrying plate and comprises a second accommodating space in which the second magnetic circuit module and the second voice coil are disposed. The second accommodating space is communicating with the first accommodating space. Wherein, the overall height of the sidewall is greater than or equal to the overall height of the first magnetic circuit module and/or the second magnetic circuit module.

In one of the embodiments, the first vibrating component comprises a first bracket and a first diaphragm. The first bracket is disposed on the two sidewalls of the magnetic conductive carrying plate. The first diaphragm is disposed at one side of the first bracket away from the sidewall and is connected to the first voice coil. The second vibrating component comprises a second bracket and a second diaphragm. The second bracket is disposed at the side magnetic conductive member. The second diaphragm is disposed at one side of the second bracket away from the side magnetic conductive member and is connected to the second voice coil.

In one of the embodiments, the double-sided speaker further comprises two auxiliary magnetic conductive members respectively disposed on the two sidewalls.

In one of the embodiments, two ends of each of the auxiliary magnetic conductive members comprise bumps. Each of the sidewalls comprises a recess corresponding to the bump. The bump is engaged with the recess.

In one of the embodiments, the first vibrating component comprises a first bracket and a first diaphragm. The first bracket is disposed on the two sidewalls of the magnetic conductive carrying plate and at the two auxiliary magnetic conductive members. The first diaphragm is disposed at one side of the first bracket away from the sidewall and is connected to the first voice coil. The second vibrating component comprises a second bracket and a second diaphragm. The second bracket is disposed at the side magnetic conductive member. The second diaphragm is disposed at one side of the second bracket away from the side magnetic conductive member and is connected to the second voice coil.

In one of the embodiments, the first magnetic circuit module further comprises a first magnet and a first magnetic conductive plate. The first magnet is disposed on a side surface of the bottom plate. The first magnetic conductive plate is disposed at one side of the first magnet away from the bottom plate. The second magnetic circuit module further comprises a second magnet and a second magnetic conductive plate. The second magnet is disposed on another side surface of the bottom plate. The second magnetic conductive plate is disposed at one side of the second magnet away from the bottom plate.

In one of the embodiments, the height of each of the sidewalls is greater than the height of the first magnet or/and the height of the second magnet.

In one of the embodiments, the height of each of the side magnetic conductive members is greater than the height of the first magnet or/and the height of the second magnet.

In one of the embodiments, the side magnetic conductive member comprises a through hole. The second bracket comprises a securing column passing through the through hole.

In one of the embodiments, one end of the securing column comprises a securing end. One end of the through hole comprises a securing hole matched with the securing end. When the securing column passes the through hole, the securing end engages with the securing hole.

In one of the embodiments, the first bracket comprises a first mating component. The second bracket comprises a second mating component. The first mating component and the second mating component are oppositely disposed and are mutually connected.

In one of the embodiments, the number of side magnetic conductive members is two. Each of the side magnetic conductive members comprises a notch. Two side edges of another side surface of the bottom plate are respectively engaged with the notches of the two side magnetic conductive members.

In one of the embodiments, the magnetic conductive carrying plate further comprises a plurality of communication holes disposed on the bottom plate. The plurality of communication holes are disposed between and communicating with the first accommodating space and the second accommodating space.

In one of the embodiments, the plurality of communication holes are arranged along the arrangement direction of the sidewall.

In one of the embodiments, the plurality of communication holes are disposed close to the sidewall.

In one of the embodiments, the double-sided speaker further comprises a first electrical connecting member and a second electrical connecting member. The first electrical connecting member is disposed at the first bracket and is exposed from an outer surface of the first bracket. The first voice coil is electrically connected to the first electrical connecting member. The second electrical connecting member is disposed at the second bracket and is exposed from an outer surface of the second bracket. The second voice coil is electrically connected to the second electrical connecting member In one of the embodiments, the position of the first electrical connecting member on the first bracket corresponds to the position of the second electrical connecting member on the second bracket.

In one of the embodiments, the first voice coil surrounds the first magnetic circuit module by a gap distance and the second voice coil surrounds the second magnetic circuit module by a gap distance.

In one of the embodiments, the sidewall and the bottom plate are integrally formed to one piece.

In one of the embodiments, the first accommodating space is communicating with the second accommodating space through a front end and a rear end of the magnetic conductive carrying plate.

On the second aspect, a double-sided speaker is provided, which comprises a magnetic conductive carrying plate component, a first magnetic circuit module, a second magnetic circuit module, a first voice coil, a second voice coil, a first vibrating component, and a second vibrating component. The magnetic conductive carrying plate component comprises a first magnetic conductive carrying plate and a second magnetic conductive carrying plate. The first magnetic conductive carrying plate comprises two first sidewalls and a first bottom plate. The two first sidewalls are disposed at two sides of the first bottom plate. The second magnetic conductive carrying plate comprises two second sidewalls and a second bottom plate. The two second sidewalls are disposed at two sides of the second bottom plate. Wherein the first bottom plate and the second bottom plate form one plane. The two first sidewalls extend toward an upper area of the second bottom plate. The two second sidewalls extend toward a lower area of the first bottom plate. The first magnetic circuit module is disposed at one side of the magnetic conductive carrying plate component. The second magnetic circuit module is disposed at another side of the magnetic conductive carrying plate component. The first voice coil is disposed between the first magnetic circuit module and the two first sidewalls. The second voice coil is disposed between the second magnetic circuit module and the two second sidewalls. The first vibrating component is disposed at one side of the magnetic conductive carrying plate component and comprises a first accommodating space in which the first magnetic circuit module and the first voice coil are disposed. The second vibrating component is disposed at another side of the magnetic conductive carrying plate component and comprises a second accommodating space in which the second magnetic circuit module and the second voice coil are disposed. The second accommodating space is communicating with the first accommodating space. Wherein the overall height of the two first sidewalls and the two second sidewalls are greater than or equal to the overall height of the first magnetic circuit module and/or the second magnetic circuit module.

In one of the embodiments, the first vibrating component comprises a first bracket and a first diaphragm. The first bracket is disposed on the two first sidewalls of the first magnetic conductive carrying plate. The first diaphragm is disposed at one side of the first bracket away from the two first sidewalls and is connected to the first voice coil. The second vibrating component comprises a second bracket and a second diaphragm. The second bracket is disposed at the two second sidewalls of the second magnetic conductive carrying plate. The second diaphragm is disposed at one side of the second bracket away from the two second sidewalls and is connected to the second voice coil.

In one of the embodiments, the first magnetic circuit module further comprises a first magnet and a first magnetic conductive plate. The first magnet is disposed on a side surface of the first bottom plate and a side surface of the second bottom plate. The first magnetic conductive plate is disposed at one side of the first magnet away from the first bottom plate and the second bottom plate. The second magnetic circuit module further comprises a second magnet and a second magnetic conductive plate. The second magnet is disposed on another side surface of the first bottom plate and another side surface of the second bottom plate. The second magnetic conductive plate is disposed at one side of the second magnet away from the first bottom plate and the second bottom plate.

In one of the embodiments, the height of each of the first sidewalls and the height of each of the second sidewalls are greater than the height of the first magnet or/and the height of the second magnet.

In one of the embodiments, the first bracket comprises a first mating component. The second bracket comprises a second mating component. The first mating component and the second mating component are oppositely disposed and are mutually connected.

In one of the embodiments, the magnetic conductive carrying plate component further comprises a plurality of communication holes disposed on the first bottom plate and the second bottom plate. The plurality of communication holes are disposed between and communicating with the first accommodating space and the second accommodating space. The plurality of communication holes are arranged along the arrangement direction of the sidewall.

In one of the embodiments, the double-sided speaker further comprises a first electrical connecting member and a second electrical connecting member. The first electrical connecting member is disposed at the first bracket and is exposed from an outer surface of the first bracket. The first voice coil is electrically connected to the first electrical connecting member. The second electrical connecting member is disposed at the second bracket and is exposed from an outer surface of the second bracket. The second voice coil is electrically connected to the second electrical connecting member.

In one of the embodiments, the position of the first electrical connecting member on the first bracket corresponds to the position of the second electrical connecting member on the second bracket.

In one of the embodiments, the first voice coil surrounds the first magnetic circuit module by a gap distance, and the second voice coil surrounds the second magnetic circuit module by a gap distance.

In one of the embodiments, the first accommodating space is communicating with the second accommodating space through a front end and a rear end of the magnetic conductive carrying plate.

A double-sided speaker is provided in the present disclosure, in which a first speaker part is formed by the magnetic conductive carrying board (or the magnetic conductive carrying board component), the first voice coil, the first magnetic circuit module, and the first vibrating component, and a second speaker part is formed by the magnetic conductive carrying plate with the side magnetic conductive member (or magnetic conductive carrying plate component), the second voice coil, the second magnetic circuit module, and the second vibrating component. The first voice coil and the second voice coil speak respectively with the first magnetic circuit module and the second magnetic circuit module for double-sided speaking. The first accommodating space and the second accommodating space are respectively two interconnected resonant cavities of the double-sided speaker. Thus, without upsizing the double-sided speaker, the size of the resonant cavity of the double-sided speaker can be enlarged to effectively improve the sounding quality for the double-sided speaker.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
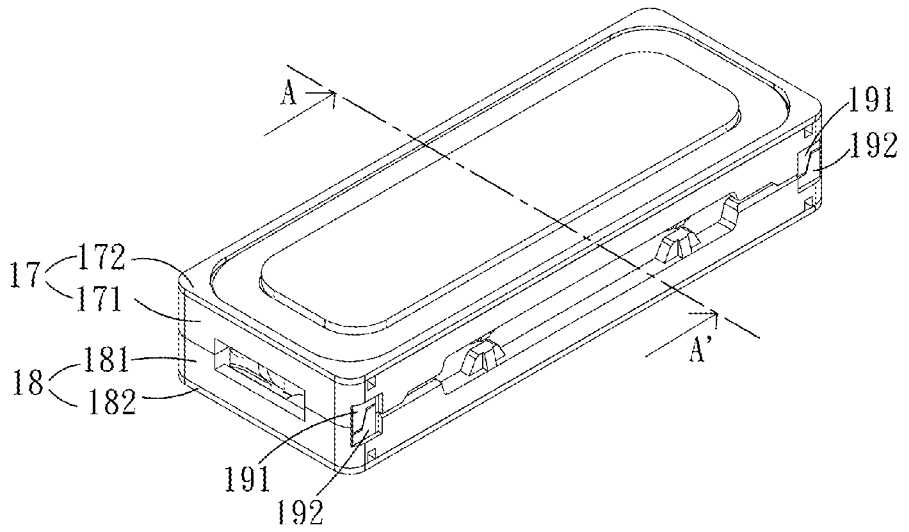
FIG. 1 is a perspective view of a double-sided speaker of the first embodiment of the present disclosure.
Figure 2:
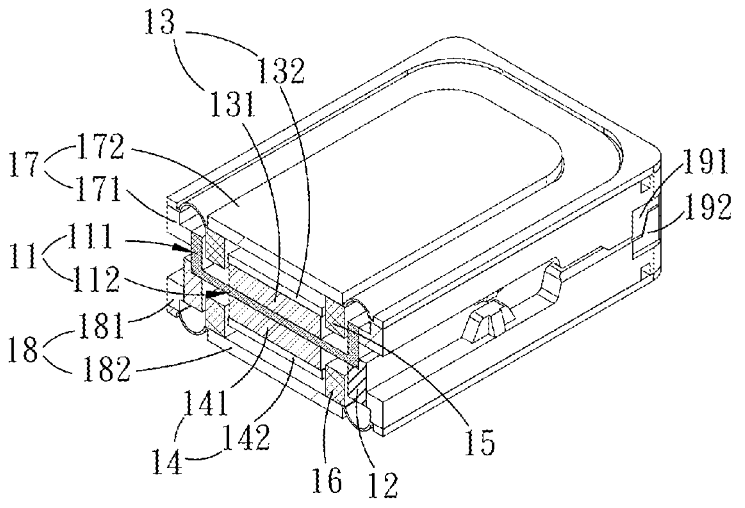
FIG. 2 is a perspective cross-sectional view along line A-A' of FIG. 1.
Figure 3:
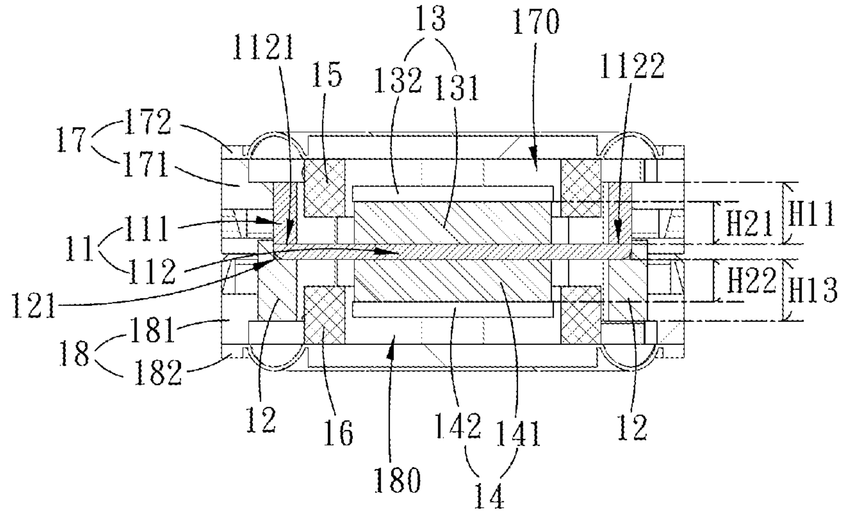
FIG. 3 is a cross-sectional view along line A-A' of FIG. 1.
Figure 4:
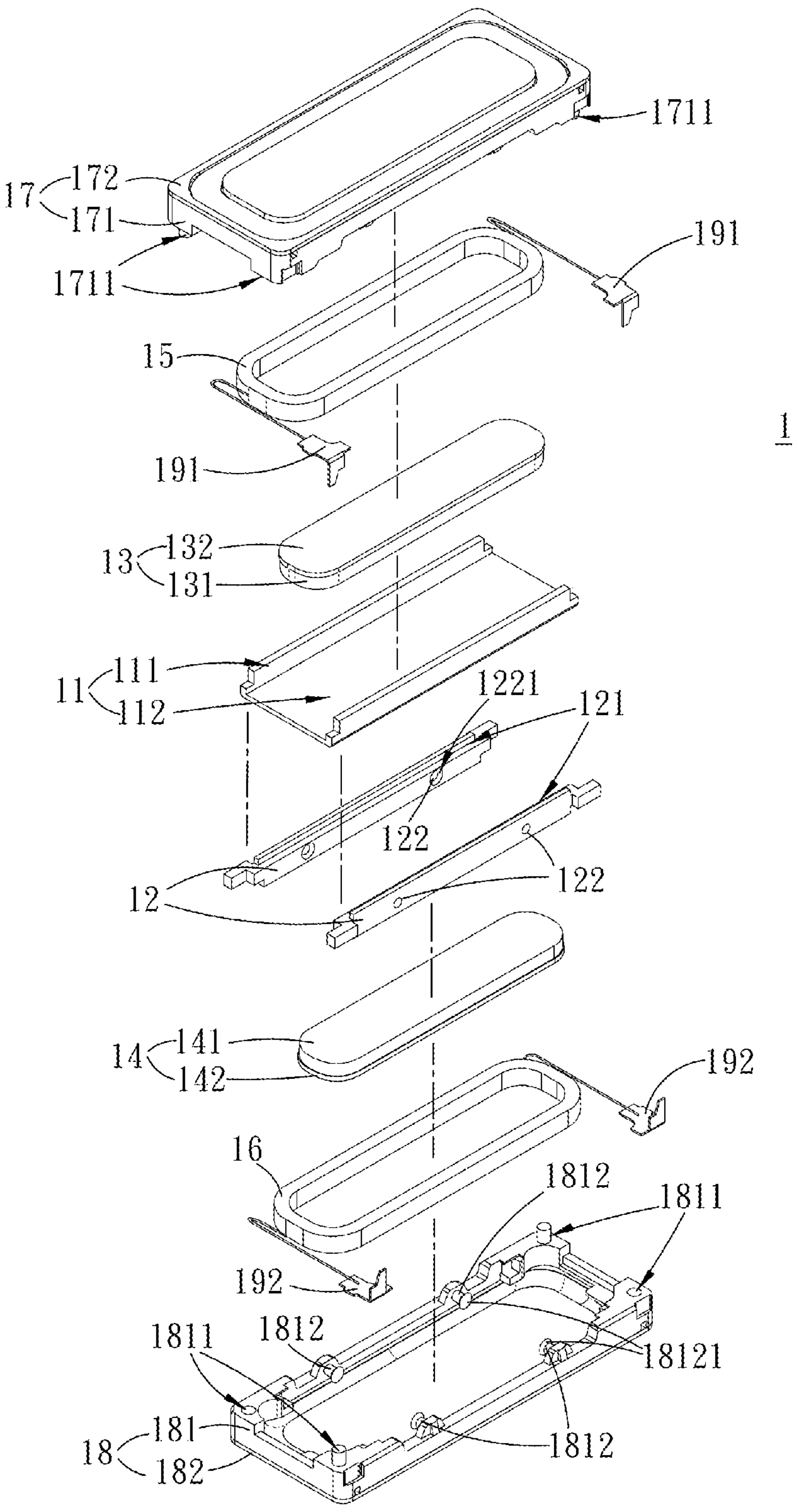
FIG. 4 is an exploded view of the double-sided speaker of the first embodiment of the present disclosure.

FIG. 1 is a perspective view of a double-sided speaker of the first embodiment of the present disclosure. FIG. 2 is a perspective cross-sectional view along line A-A' of FIG. 1. FIG. 3 is a cross-sectional view along line A-A' of FIG. 1. FIG. 4 is an exploded view of the double-sided speaker of the first embodiment of the present disclosure. As shown in the figures, the present disclosure provides a double-sided speaker 1 comprising a magnetic conductive carrying plate 11, a side magnetic conductive member 12, a first magnetic circuit module 13, a second magnetic circuit module 14, a first voice coil 15, a second voice coil 16, a first vibrating component 17, and a second vibrating component 18. The magnetic conductive carrying plate 11 comprises two sidewalls 111 and a bottom plate 112. The two sidewalls 111 are disposed at two side edges of a side surface of the bottom plate 112. The side magnetic conductive member 12 is disposed on two side edges of another side surface of the bottom plate 112. The first magnetic circuit module 13 is disposed at one side of the magnetic conductive carrying plate 11. The second magnetic circuit module 14 is disposed at another side of the magnetic conductive carrying plate 11. The first voice coil 15 surrounds the first magnetic circuit module 13 by a gap distance and is disposed between the first magnetic circuit module 13 and the sidewall 111. The second magnetic circuit module 16 surrounds the second magnetic circuit module 14 by a gap distance and is disposed between the second magnetic circuit module 14 and the side magnetic conductive member 12. The first vibrating component 17 is disposed at one side of the magnetic conductive carrying plate 11 and comprises a first accommodating space 170 in which the first magnetic circuit module 13 and the first voice coil 15 are disposed. The second vibrating component 18 is disposed at another side of the magnetic conductive carrying plate 11 and comprises a second accommodating space 180 in which the second magnetic circuit module 14 and the second voice coil 16 are disposed. The second accommodating space 180 is communicating with the first accommodating space 170. Wherein, the first accommodating space 170 and the second accommodating space 180 are intercommunicated through a front end and a rear end not having the sidewall 111 of the magnetic conductive carrying plate 11 for air circulation between the first vibrating component 17 and the second vibrating component 18 for generating and enhancing stereo resonance sound when the speaker is under operation.

In this embodiment, the overall height of the sidewall 111 of the magnetic conductive carrying plate 11 is greater than or equal to the overall height of the first magnetic circuit module 13 and/or the second magnetic circuit module 14. In this embodiment, the overall height of the sidewall 111 may be configured to be greater than that of the first magnetic circuit module 13 and/or the second magnetic circuit module 14 as an example, but it is not limited thereto. Specifically, the number of the sidewalls 111 of the magnetic conductive carrying plate 11 is two. A side surface of the bottom plate 112 comprises a first side edge 1121 and a second side edge 1122 opposite to the first side edge 1121. The two sidewalls 111 are respectively disposed at the first side edge 1121 and the second side edge 1122 of the bottom plate 112. Wherein, the sidewall 111 and the bottom plate 112 can be integrally formed to one piece. Similarly, the number of the side magnetic conductive members 12 is two, each of which comprises a notch 121. Two side edges of another side surface of the bottom plate 112 are respectively engaged with the notches 121 of the two side magnetic conductive members 12. Wherein the sidewalls 111 correspond to the positions of the side magnetic conductive members 12 relative to two sides of the bottom plate 112.

Besides, the first magnetic circuit module 13 further comprises a first magnet 131 and a first magnetic conductive plate 132. The first magnet 131 is disposed on a side surface of the bottom plate 112. The first magnetic conductive plate 132 is disposed at one side of the first magnet 131 away from the bottom plate 112. The second magnetic circuit module 14 further comprises a second magnet 141 and a second magnetic conductive plate 142. The second magnet 141 is disposed on another side surface of the bottom plate 112. The second magnetic conductive plate 142 is disposed at one side of the second magnet 141 away from the bottom plate 112. Wherein, according to the height of the bottom plate 112 perpendicular to the magnetic conductive carrying plate 11, the height H11 of the sidewall 111 is greater than the height H21 of the first magnet 131 or/and the height H22 of the second magnet 141. When the height H11 of the sidewall 111 of the magnetic conductive carrying plate 11 is greater than the height H21 of the first magnet 131, which indicates that the sidewall 111 of the magnetic conductive carrying plate 11 could cover most of the range of the magnetic field lines of the first magnet 131, the sidewall 111 of the magnetic conductive carrying plate 11 would help the concentration of the magnetic field lines of the first magnet 131 to enable the first magnet 131 to generate an excellent magnetic field. Furthermore, the height H13 of the side magnetic conductive member 12 is greater than the height H21 of the first magnet 131 or/and the height H22 of the second magnet 141. When the height H13 of the side magnetic conductive member 12 is greater than the height H22 of the second magnet 141, which indicates that the magnetic conductive carrying plate 11 and the side magnetic conductive member 12 could cover most of the range of the magnetic field lines of the second magnet 141, an excellent magnetic field can also be generated.

Figure 5:
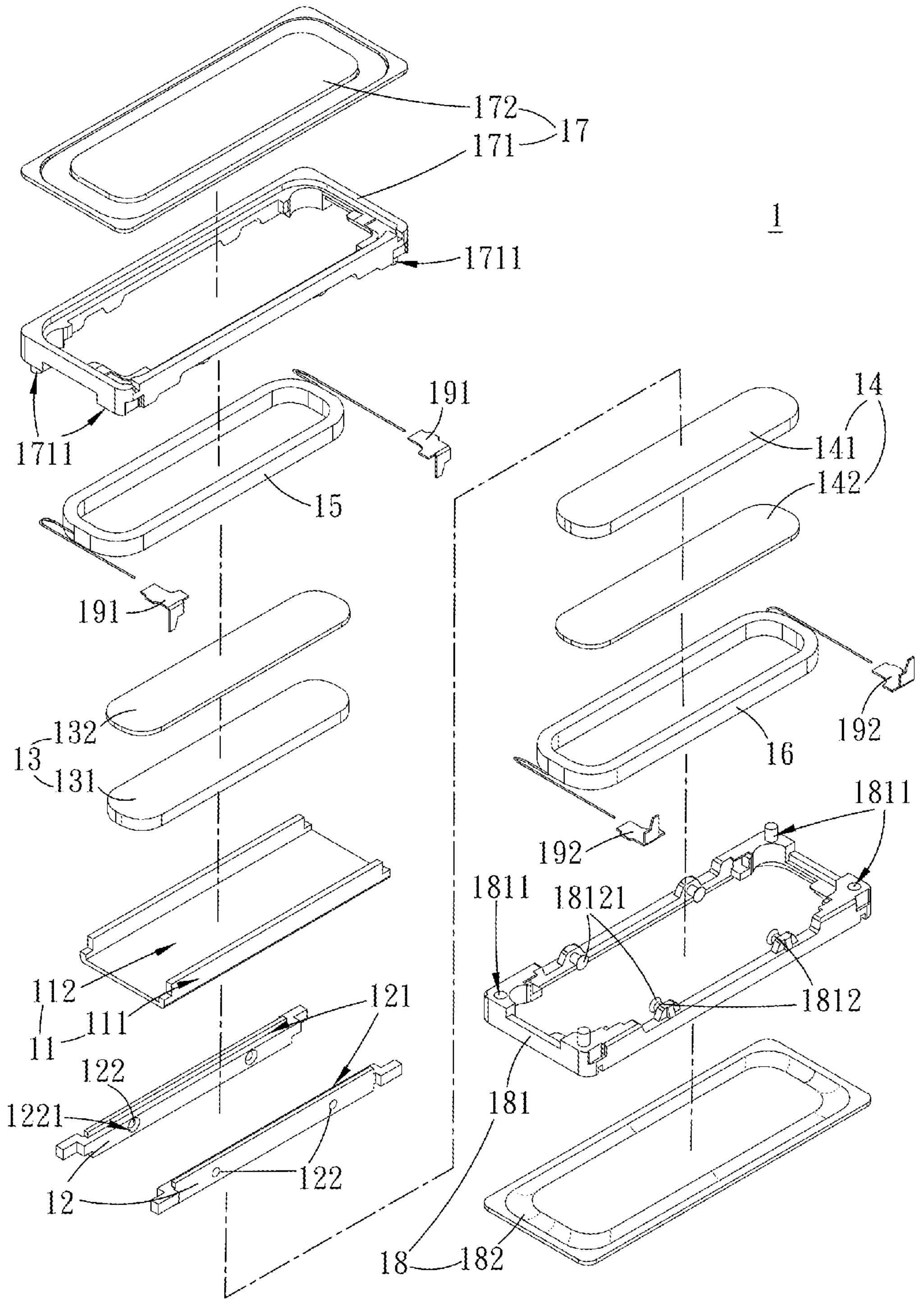
FIG. 5 is another exploded view of the double-sided speaker of the first embodiment of the present disclosure.

FIG. 5 is another exploded view of the double-sided speaker of the first embodiment of the present disclosure. As shown in the figure, in this embodiment, the first vibrating component 17 comprises a first bracket 171 and a first diaphragm 172. The first bracket 171 is disposed at one side of the magnetic conductive carrying plate 11. The first diaphragm 172 is disposed at one side of the first bracket 171 away from the two sidewalls 111 and is connected to the first voice coil 15. The second vibrating component 18 comprises a second bracket 181 and a second diaphragm 182. The second bracket 181 is disposed at another side of the magnetic conductive carrying plate 11. The second diaphragm 182 is disposed at one side of the second bracket 181 away from the side magnetic conductive member 12 and is connected to the second voice coil 16. Wherein, the first bracket 171 is secured to the two sidewalls 111, and the second bracket 181 is secured to the two side magnetic conductive members 12.

More specifically, the first bracket 171 is disposed on the two sidewalls 111 of the magnetic conductive carrying plate 11, and the second bracket 181 is disposed at the two side magnetic conductive members 12. Each of the side magnetic conductive members 12 comprises a through hole 122, the second bracket 181 comprises a securing column 1812 passing through the through hole 122. Wherein one end of the securing column 1812 comprises a securing end 18121, and one end of the through hole 122 comprises a securing hole 1221 matched with the securing end 18121. When the securing column 1812 passes the through hole 122, the securing end 18121 would engage with the securing hole 1221. The securing end 18121 could restrict the side magnetic conductive member 12 from disengaging from the securing column 1812.

Furthermore, the first bracket 171 comprises a first mating component 1711. The second bracket 181 comprises a second mating component 1811. The first mating component 1711 and the second mating component 1811 are oppositely disposed. The first bracket 171 is disposed on the second bracket 181. The first mating component 1711 and the second mating component 1811 are mutually connected and secured. Wherein The first mating component 1711 and the second mating component 1811 could be columns or holes. As the first mating component 1711 and the second mating component 1811 are oppositely disposed, the columns can be engaged with the holes to strengthen the engagement between the first bracket 171 and the second bracket 181.

Besides, in this embodiment, the double-sided speaker 1 further comprises a first electrical connecting member 191 and a second electrical connecting member 192. The first electrical connecting member 191 is disposed at the first bracket 171 and is exposed from an outer surface of the first bracket 171. The first voice coil 15 is electrically connected to the first electrical connecting member 191. The second electrical connecting member 192 is disposed at the second bracket 181 and is exposed from an outer surface of the second bracket 181. The second voice coil 16 is electrically connected to the second electrical connecting member 192. Wherein the position of the first electrical connecting member 191 on the first bracket 171 corresponds to the position of the second electrical connecting member 192 on the second bracket 181.

In this embodiment, an external power supply could conduct an electric current to the first voice coil 15 through the first electrical connecting member 191, and also to the second voice coil 16 through the second electrical connecting member 192. The first voice coil 15 and the second voice coil 16 could generate a magnetic field when an electric current is introduced in. In this way, the magnitude and direction of the magnetic field generated by the first voice coil 15 and the second voice coil 16 can be altered by selecting the magnitude of electric current introduced into the first voice coil 15 and the second voice coil 16. The magnetic field of the first voice coil 15 would interact with the magnetic field of the first magnetic circuit module 13 so that the first voice coil 15 could generate vibration which is orthogonal to the direction of the electric current, and the first voice coil 15 could drive the first diaphragm 172 to vibrate for sounding. Similarly, the magnetic field of the second voice coil 16 would interact with the magnetic field of the second magnetic circuit module 14 so that the second voice coil 16 could generate vibration which orthogonal to the direction of the electric current, and the second voice coil 16 could drive the second diaphragm 182 to vibrate for sounding. In this embodiment, a first speaker part is formed by the magnetic conductive carrying plate 11, the first magnetic circuit module 13, the first voice coil 15, and the first vibrating component 17, and a second speaker part is formed by the magnetic conductive carrying plate 11, the second magnetic circuit module 14, the second voice coil 16, and the second vibrating component 18. Thus, the double-sided speaker 1 could perform double-sided speaking.

More specifically, since the first voice coil 15 and the second voice coil 16 have the same vibration mass which could cancel each other out, the vibration of the double-sided speaker 1 would be reduced, the size of vibration area of the first diaphragm 172 and the second diaphragm 182 would be increased, and the performance of the double-sided speaker 1 would also be improved. In addition, in this embodiment, the first accommodating space 170 and the second accommodating space 180 are respectively one of the two resonant cavities of the double-sided speaker 1, which are interconnected. In this way, the volume of the resonant cavity of the double-sided speaker 1 can be enlarged without upsizing the double-sided speaker 1 to effectively improve the stereo sound quality of the double-sided speaker 1.

Figure 6:
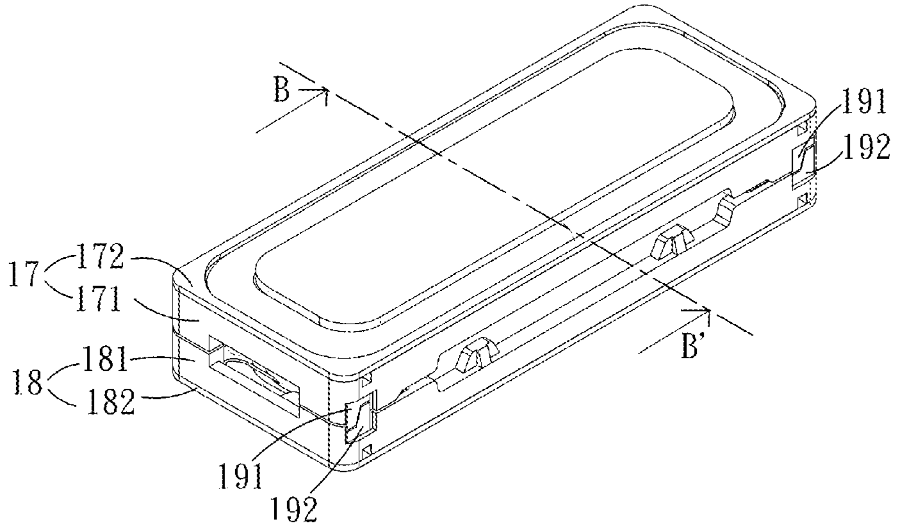
FIG. 6 is a perspective view of a double-sided speaker of the second embodiment of the present disclosure.
Figure 7:
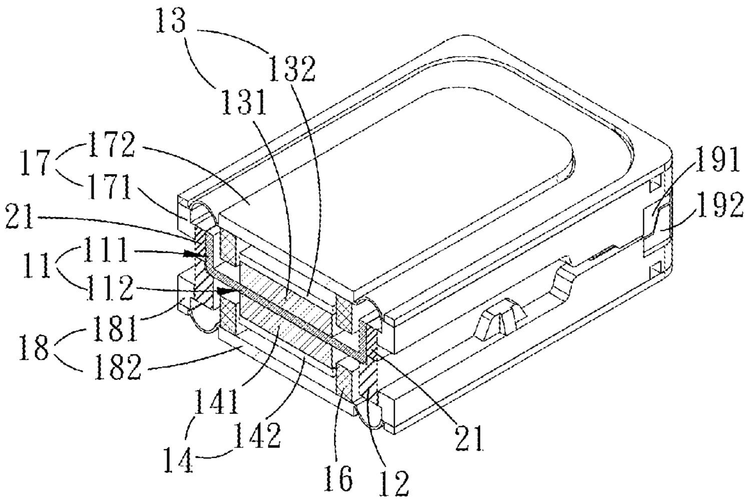
FIG. 7 is a perspective cross-sectional view along line B-B' of FIG. 6.
Figure 8:
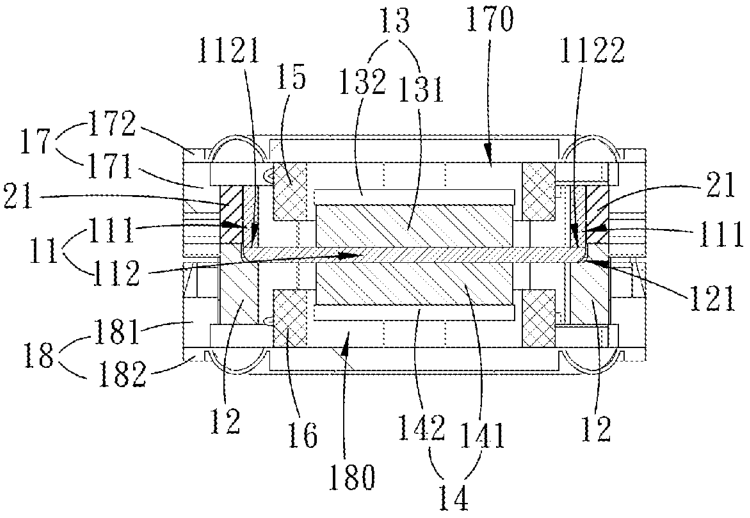
FIG. 8 is a cross-sectional view along line B-B' of FIG. 6.
Figure 9:
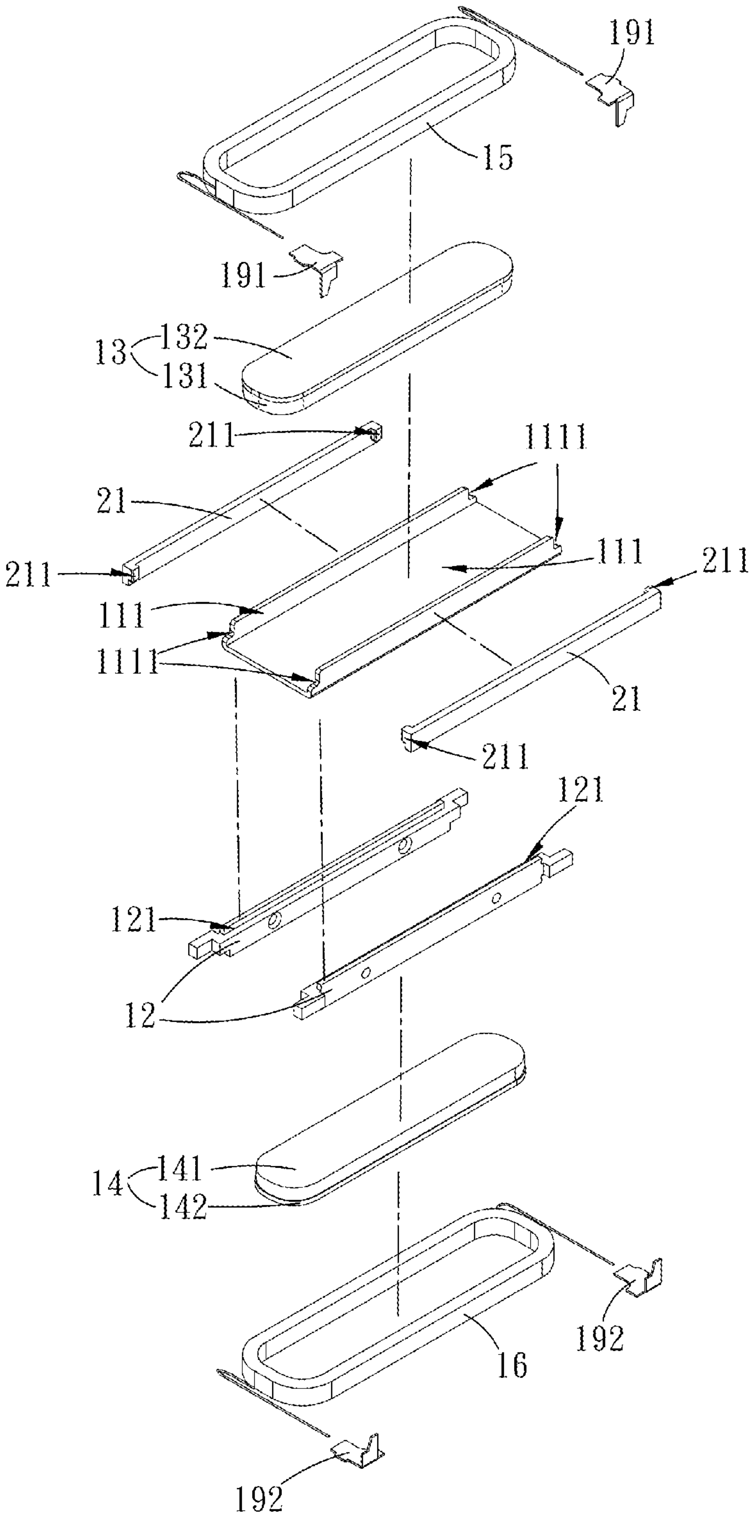
FIG. 9 is an exploded view showing the internal components of the double-sided speaker of the second embodiment of the present disclosure.

FIG. 6 is a perspective view of a double-sided speaker of the second embodiment of the present disclosure. FIG. 7 is a perspective cross-sectional view along line B-B' of FIG. 6. FIG. 8 is a cross-sectional view along line B-B' of FIG. 6. FIG. 9 is an exploded view showing the internal components of the double-sided speaker of the second embodiment of the present disclosure. As shown in the figures, the difference between this embodiment and the first embodiment is that it further comprises two auxiliary magnetic conductive members 21, which are respectively disposed on the two sidewalls 111. Wherein two ends of each of the auxiliary magnetic conductive members 21 comprise bumps 211. Each of the sidewalls 111 comprises a recess 1111 corresponding to the bump 211. The bump 211 of the auxiliary magnetic conductive member 21 is engaged with the recess 1111 of the sidewall 111. In this embodiment, by disposing the auxiliary magnetic conductive members 21 on two sides of the magnetic conductive carrying plate 11, the auxiliary magnetic conductive members 21 would concentrate the magnetic field lines of the magnetic conductive carrying plate 11 to enhance the magnetic field generated by the first magnetic circuit module 13. Furthermore, the first bracket 171 is disposed on the two sidewalls 111 of the magnetic conductive carrying plate 11 and at the two auxiliary magnetic conductive members 21, and the second bracket 181 is disposed at the side magnetic conductive member 12.

Figure 10:
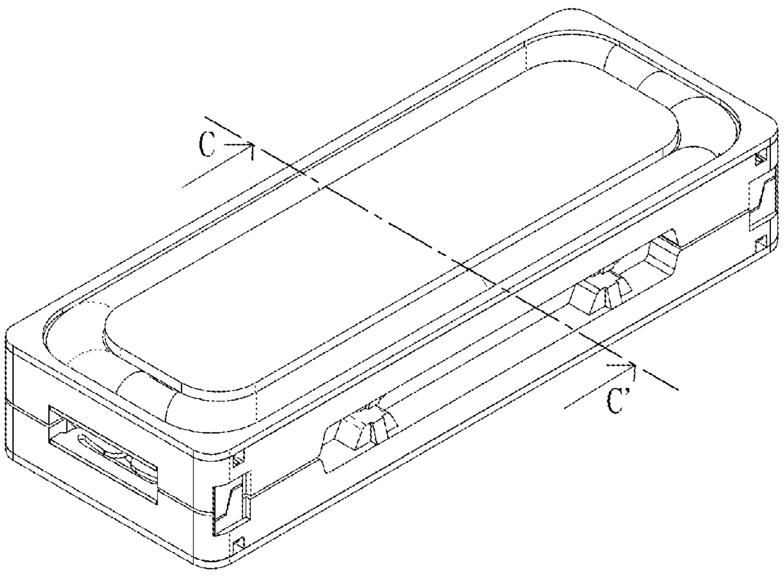
FIG. 10 is a perspective view of a double-sided speaker of the third embodiment of the present disclosure.
Figure 11:
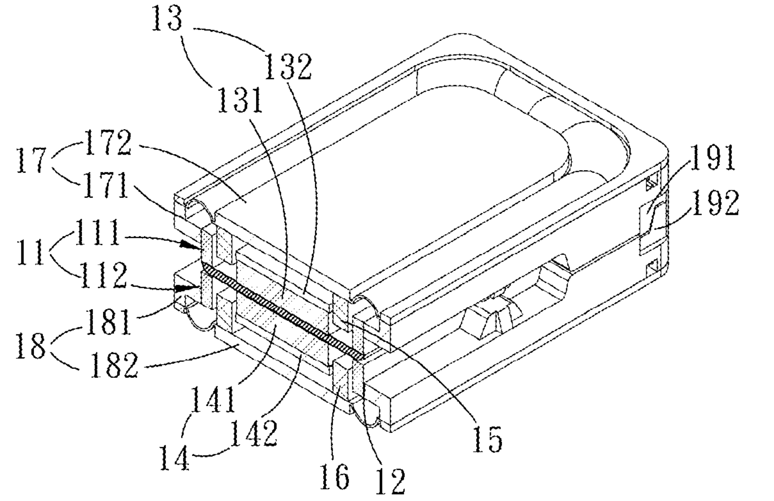
FIG. 11 is a perspective cross-sectional view along line C-C' of FIG. 10.
Figure 12:
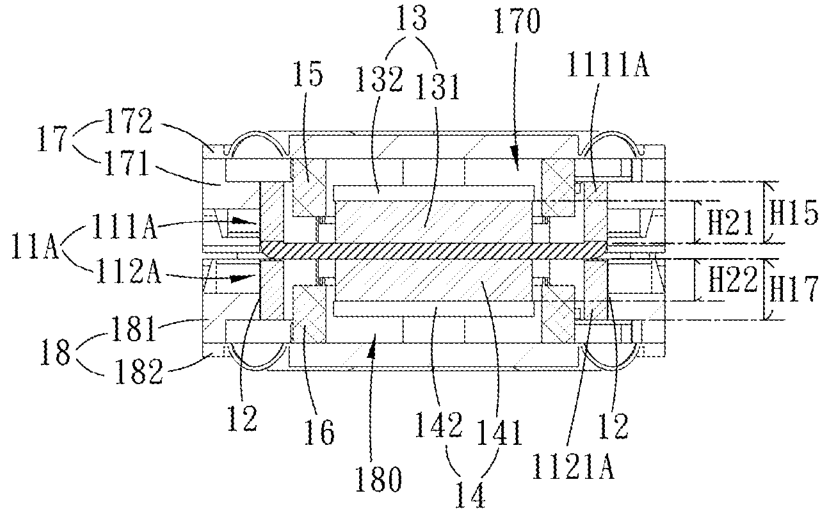
FIG. 12 is a cross-sectional view along line C-C' of FIG. 10.
Figure 13:
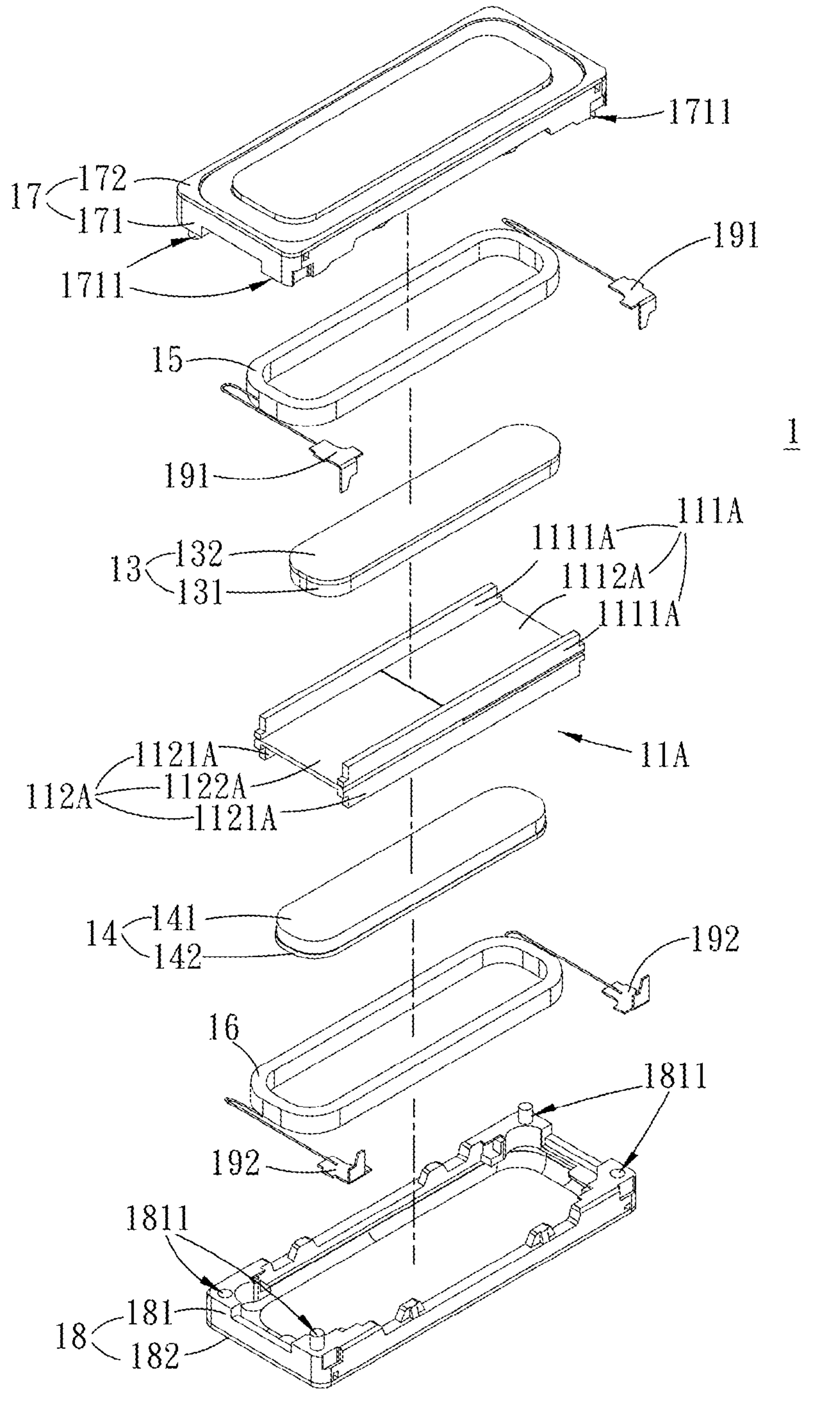
FIG. 13 is an exploded view of the double-sided speaker of the third embodiment of the present disclosure.
Figure 14:
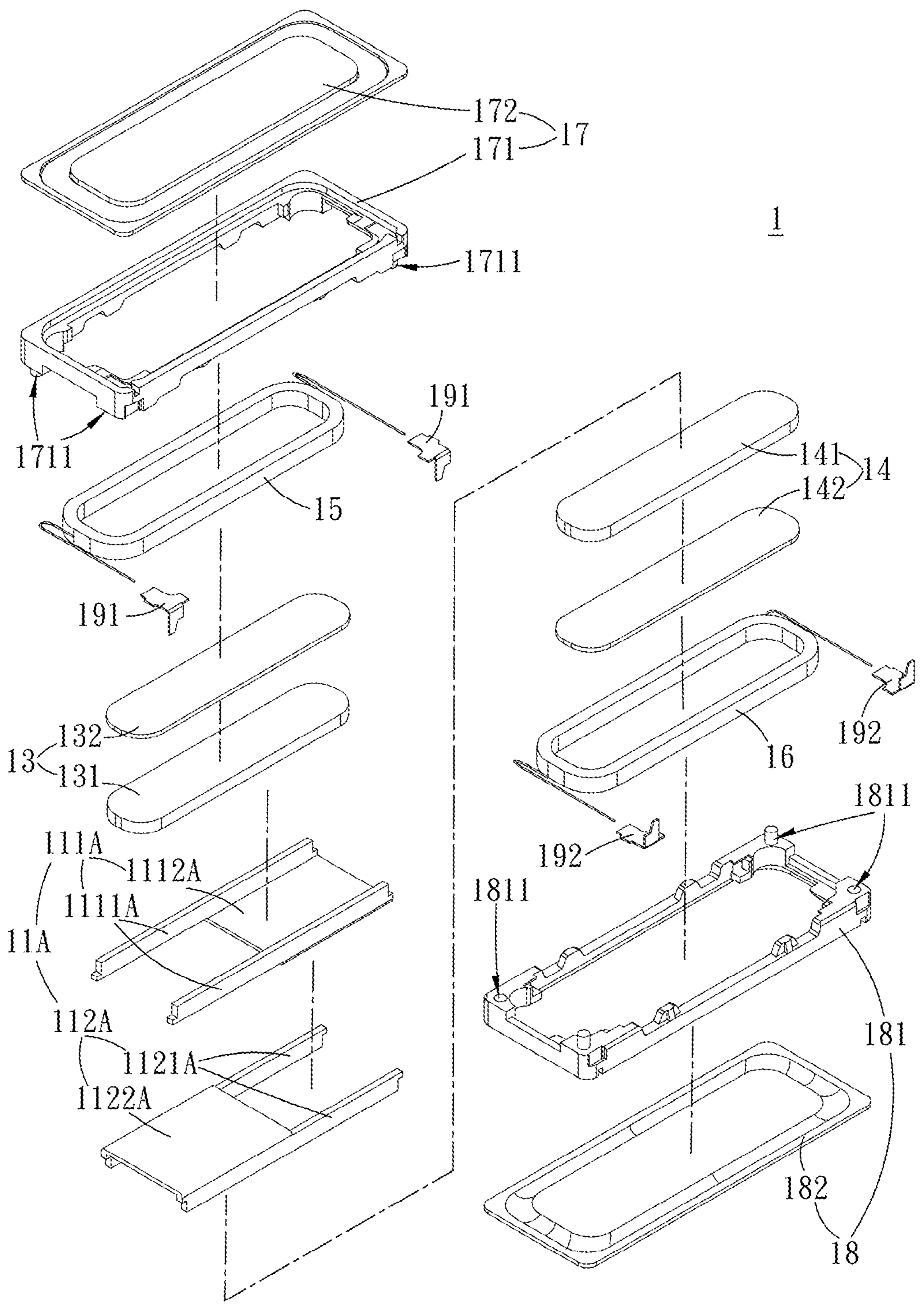
FIG. 14 is another exploded view of the double-sided speaker of the third embodiment of the present disclosure.

FIG. 10 is a perspective view of a double-sided speaker of the third embodiment of the present disclosure. FIG. 11 is a perspective cross-sectional view along line C-C' of FIG. 10. FIG. 12 is a cross-sectional view along line C-C' of FIG. 10. FIG. 13 and FIG. 14 are exploded views of the double-sided speaker of the third embodiment of the present disclosure. As shown in the figures, the difference between this embodiment and the first embodiment is that the magnetic conductive carrying plate component 11A replaces the combination of the magnetic conductive carrying plate 11 with the side magnetic conductive member 12. In this embodiment, the double-sided speaker comprises a magnetic conductive carrying plate component 11A, a first magnetic circuit module 13, a second magnetic circuit module 14, a first voice coil 15, a second voice coil 16, a first vibrating component 17, and a second vibrating component 18. The magnetic conductive carrying plate component 11A comprises a first magnetic conductive carrying plate 111A and a second magnetic conductive carrying plate 112A. The first magnetic conductive carrying plate 111A comprises two first sidewalls 1111A and a first bottom plate 1112A. The two first sidewalls 1111A are disposed at two sides of the first bottom plate 1112A. The second magnetic conductive carrying plate 112A comprises two second sidewalls 1121A and a second bottom plate 1122A. The two second sidewalls 1121A are disposed at two sides of the second bottom plate 1122A. Wherein the first bottom plate 1112A and the second bottom plate 1122A form one plane. The two first sidewalls 1111A extend toward an upper area of the second bottom plate 1122A. The two second sidewalls 1121A extend toward a lower area of the first bottom plate 1112A. The first magnetic circuit module 13 is disposed at one side of the magnetic conductive carrying plate component 11A. The second magnetic circuit module 14 is disposed at another side of the magnetic conductive carrying plate component 11A. The first voice coil 15 surrounds the first magnetic circuit module 13 by a gap distance and is disposed between the first magnetic circuit module 13 and the two first sidewalls 1111A. The second voice coil 16 surrounds the second magnetic circuit module 14 by a gap distance and is disposed between the second magnetic circuit module 14 and the two second sidewalls 1121A.

Furthermore, the first vibrating component 17 is disposed at one side of the magnetic conductive carrying plate component 11A and comprises a first accommodating space 170 in which the first magnetic circuit module 13 and the first voice coil 15 are disposed. The second vibrating component 18 is disposed at another side of the magnetic conductive carrying plate component 11A and comprises a second accommodating space 180 in which the second magnetic circuit module 14 and the second voice coil 16 are disposed. The second accommodating space 180 is communicating with the first accommodating space 170. The first accommodating space 170 and the second accommodating space 180 are interconnected through a front end and a rear end not having two first sidewalls 1111A and two second sidewalls 1121A of the magnetic conductive carrying plate component 11A.

In this embodiment, the structural configuration of the first magnetic conductive carrying plate 111A is identical to the structural configuration of the second magnetic conductive carrying plate 112A. The two first sidewalls 1111A are disposed at two sides of the first bottom plate 1112A and horizontally extend beyond a surface of the first bottom plate 1112A. The length of the two first sidewalls 1111A extending beyond the first bottom plate 1112A is equal to the length of the second bottom plate 1122A. The two second sidewalls 1121A are disposed on two sides of the second bottom plate 1122A and horizontally extend beyond a surface of the second bottom plate 1122A. The length of the two second sidewalls 1121A extending beyond the second bottom plate 1122A is equal to the length of the first bottom plate 1112A. Wherein the two first sidewalls 1111A and the first bottom plate 1112A are integrally formed to one piece, and the two second sidewalls 1121A and the second bottom plate 1122A are integrally formed to one piece. The first magnetic conductive carrying plate 111A is arranged reverse with the second magnetic conductive carrying plate 112A and can be correspondingly assembled to the second magnetic conductive carrying plate 112A. The first bottom plate 1112A and the second bottom plate 1122A commonly form one plane. The two first sidewalls 1111A are upper sidewalls common to the first bottom plate 1112A and the second bottom plate 1122A, and the two second sidewalls 1121A are lower sidewalls common to the first bottom plate 1112A and the second bottom plate 1122A. In this way, the structural strength of the magnetic conductive carrying plate component 11A can be strengthened. Besides, since the first magnetic conductive carrying plate 111A and the second magnetic conductive carrying plate 112A share the same structural design and are simple to manufacture, there is no need for additional part design and mold opening, and manufacturing cost can be reduced.

More specifically, in this embodiment, the overall height of the two first sidewalls 1111A and the two second sidewalls 1121A are greater than or equal to the overall height of the first magnetic circuit module 13 and/or the second magnetic circuit module 14. This embodiment could be, but is not limited to, an example where the overall height of the two first sidewalls 1111A and the two second sidewalls 1121A is greater than that of the first magnetic circuit module 13 and/or the second magnetic circuit module 14. Specifically, the first bracket 171 of the first vibrating component 17 is secured to the two first sidewalls 1111A, and the second bracket 181 is secured to the two side magnetic conductive members 12. The second bracket 181 of the second vibrating component 18 is secured to the two second sidewalls 1121A. Furthermore, the first magnet 131 of the first magnetic circuit module 13 is disposed at a side surface of the first bottom plate 1112A and a side surface of the second bottom plate 1122A. The second magnet 141 of the second magnetic circuit module 14 is disposed at another side surface of the first bottom plate 1112A and another side surface of the second bottom plate 1122A. Wherein the height H15 of each of the first sidewalls 1111A and the height H17 of each of the second sidewalls 1121A are greater than the height H21 of the first magnet 131 or/and the height H22 of the second magnet 141.

Besides, in this embodiment, the structural configurations of the first magnetic circuit module 13, the second magnetic circuit module 14, the first voice coil 15, the second voice coil 16, the first vibrating component 17, the second vibrating component 18, the first electrical connecting member 191, and the second electrical connecting member 192 present the same arrangement and effect as those in the first embodiment and the second embodiment described above, so it would not be repeated herein again.

Figure 15:
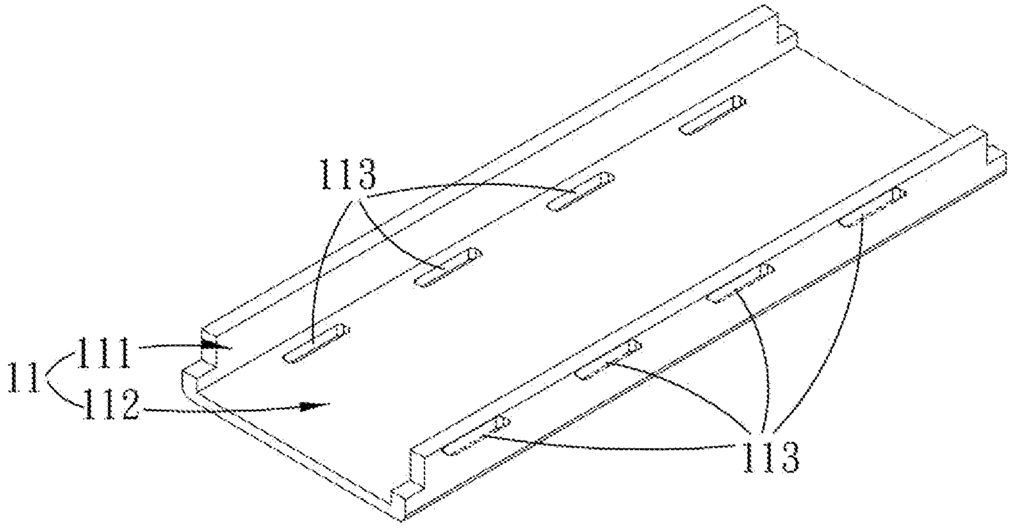
FIG. 15 is a perspective view showing a magnetic conductive carrying plate having a plurality of communication holes in the present disclosure.

FIG. 15 is a perspective view showing a magnetic conductive carrying plate having a plurality of communication holes in the present disclosure. As shown in the figure, the difference between the structural configuration of the bottom plate 112 of the magnetic conductive carrying plate 11 of the first embodiment/second embodiment and that of this embodiment is that this embodiment further comprises a plurality of communication holes 113. The plurality of communication holes 113 are disposed on the bottom plate 112. The plurality of communication holes 113 are disposed between and communicating with the first accommodating space 170 and the second accommodating space 180. The plurality of communication holes 113 facilitate the resonance of the first accommodating space 170 and the second accommodating space 180, i.e. the vibrating airflow to circulate between the first accommodating space 170 and the second accommodating space 180 during operation. Wherein the plurality of communication holes 113 are arranged at intervals along the arrangement direction of the sidewall 111 and are disposed close to the sidewall 111. This embodiment does not limit the arrangement of the communication holes 113 on the bottom plate 112, which can be adjusted according to requirements.

Figure 16:
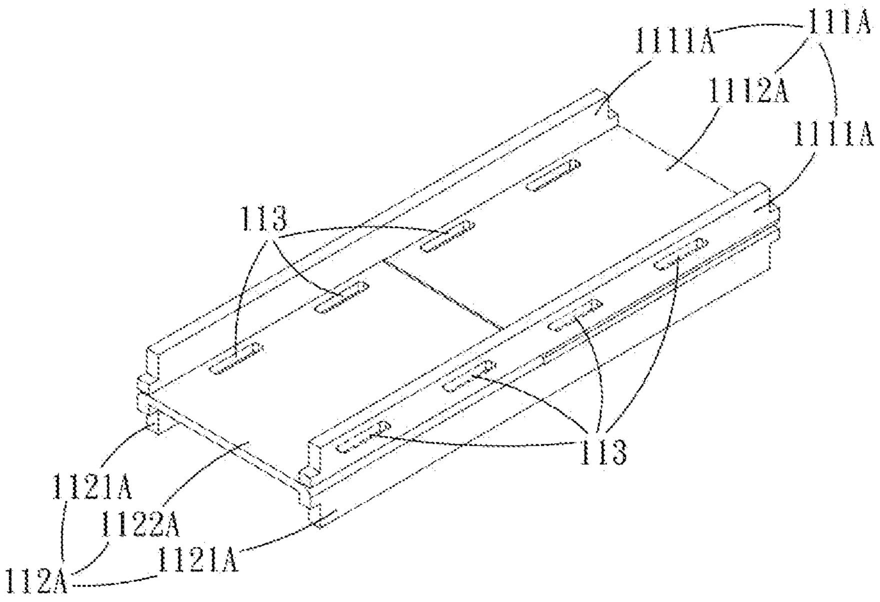
FIG. 16 is a perspective view showing a magnetic conductive carrying plate component having a plurality of communication holes in the present disclosure.

FIG. 16 is a perspective view showing a magnetic conductive carrying plate component having a plurality of communication holes in the present disclosure. As shown in the figure, the difference between the structural configuration of the first bottom plate 1112A of the first magnetic conductive carrying plate 111A and the second bottom plate 1122A of the second magnetic conductive carrying plate 112A of the third embodiment and that of this embodiment is that this embodiment further comprises a plurality of communication holes 113. The plurality of communication holes 113 are disposed on the first bottom plate 1112A and the second bottom plate 1122A. The plurality of communication holes 113 are disposed between and communicating with the first accommodating space 170 and the second accommodating space 180. The plurality of communication holes 113 facilitate the resonance of the first accommodating space 170 and the second accommodating space 180, i.e. the vibrating airflow to circulate between the first accommodating space 170 and the second accommodating space 180 during operation. Wherein the plurality of communication holes 113 are arranged at intervals along the arrangement direction of the first sidewall 1111A and the second sidewall 1121A and are disposed close to the first sidewall 1111A and the second sidewall 1121A. This embodiment does not limit the arrangement of the communication holes 113 on the first bottom plate 1112A and the second bottom plate 1122A, which can be adjusted according to requirements.

In summary, a double-sided speaker is provided in the present disclosure, in which a first speaker part is formed by the magnetic conductive carrying board (or the magnetic conductive carrying board component), the first voice coil, the first magnetic circuit module, and the first vibrating component, and a second speaker part is formed by the magnetic conductive carrying plate with the side magnetic conductive member (or magnetic conductive carrying plate component), the second voice coil, the second magnetic circuit module, and the second vibrating component. The first voice coil and the second voice coil speak respectively with the first magnetic circuit module and the second magnetic circuit module for double-sided speaking. The first accommodating space and the second accommodating space are respectively two interconnected resonant cavities of the double-sided speaker. Thus, without upsizing the double-sided speaker, the size of the resonant cavity of the double-sided speaker can be enlarged to effectively improve the sounding quality for the double-sided speaker.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A double-sided speaker, comprising: a magnetic conductive carrying plate comprising two sidewalls and a bottom plate, the two sidewalls being disposed at two side edges of a side surface of the bottom plate; a side magnetic conductive member disposed on two side edges of another side surface of the bottom plate; a first magnetic circuit disposed at one side of the magnetic conductive carrying plate; a second magnetic circuit disposed at another side of the magnetic conductive carrying plate; a first voice coil disposed between the first magnetic circuit and the sidewall; a second voice coil disposed between the second magnetic circuit and the side magnetic conductive member; a first vibrating disposed at one side of the magnetic conductive carrying plate and comprising a first accommodating space in which the first magnetic circuit and the first voice coil being disposed; and a second vibrating disposed at another side of the magnetic conductive carrying plate and comprising a second accommodating space in which the second magnetic circuit and the second voice coil being disposed, the second accommodating space being communicating with the first accommodating space; wherein the overall height of the sidewall is greater than or equal to the overall height of the first magnetic circuit and/or the second magnetic circuit.

2. The double-sided speaker according to claim 1, wherein the first vibrating comprises a first bracket and a first diaphragm; the first bracket is disposed on the two sidewalls of the magnetic conductive carrying plate; the first diaphragm is disposed at one side of the first bracket away from the sidewall and is connected to the first voice coil; the second vibrating comprises a second bracket and a second diaphragm; the second bracket is disposed at the side magnetic conductive member; the second diaphragm is disposed at one side of the second bracket away from the side magnetic conductive member and is connected to the second voice coil.

3. The double-sided speaker according to claim 1 comprising two auxiliary magnetic conductive members respectively disposed on the two sidewalls.

4. The double-sided speaker according to claim 3, wherein two ends of each of the auxiliary magnetic conductive members comprise bumps; each of the sidewalls comprises a recess corresponding to the bump; the bump is engaged with the recess.

5. The double-sided speaker according to claim 3, wherein the first vibrating comprises a first bracket and a first diaphragm; the first bracket is disposed on the two sidewalls of the magnetic conductive carrying plate and at the two auxiliary magnetic conductive members; the first diaphragm is disposed at one side of the first bracket away from the sidewall and is connected to the first voice coil; the second vibrating comprises a second bracket and a second diaphragm; the second bracket is disposed at the side magnetic conductive member; the second diaphragm is disposed at one side of the second bracket away from the side magnetic conductive member and is connected to the second voice coil.

6. The double-sided speaker according to claim 1, wherein the first magnetic circuit further comprises a first magnet and a first magnetic conductive plate; the first magnet is disposed on a side surface of the bottom plate; the first magnetic conductive plate is disposed at one side of the first magnet away from the bottom plate; the second magnetic circuit further comprises a second magnet and a second magnetic conductive plate; the second magnet is disposed on another side surface of the bottom plate; the second magnetic conductive plate is disposed at one side of the second magnet away from the bottom plate.

7. The double-sided speaker according to claim 6, wherein the height of each of the sidewalls is greater than the height of the first magnet or/and the height of the second magnet.

8. The double-sided speaker according to claim 6, wherein the height of each of the side magnetic conductive members is greater than the height of the first magnet or/and the height of the second magnet.

9. The double-sided speaker according to claim 2, wherein the side magnetic conductive member comprises a through hole; the second bracket comprises a securing column passing through the through hole.

10. The double-sided speaker according to claim 9, wherein one end of the securing column comprises a securing end; one end of the through hole comprises a securing hole matched with the securing end; when the securing column passes the through hole, the securing end engages with the securing hole.

11. The double-sided speaker according to claim 2, wherein the first bracket comprises a first mating; the second bracket comprises a second mating; the first mating and the second mating are oppositely disposed and are mutually connected.

12. The double-sided speaker according to claim 1, wherein the number of side magnetic conductive members is two; each of the side magnetic conductive members comprises a notch; two side edges of another side surface of the bottom plate are respectively engaged with the notches of the two side magnetic conductive members.

13. The double-sided speaker according to claim 1, wherein the magnetic conductive carrying plate further comprises a plurality of communication holes disposed on the bottom plate; the plurality of communication holes are disposed between and communicating with the first accommodating space and the second accommodating space.

14. The double-sided speaker according to claim 13, wherein the plurality of communication holes are arranged along the arrangement direction of the sidewall.

15. The double-sided speaker according to claim 13, wherein the plurality of communication holes are disposed close to the sidewall.

16. The double-sided speaker according to claim 2 comprising a first electrical connecting member and a second electrical connecting member, the first electrical connecting member being disposed at the first bracket and being exposed from an outer surface of the first bracket, the first voice coil being electrically connected to the first electrical connecting member, the second electrical connecting member being disposed at the second bracket and being exposed from an outer surface of the second bracket, the second voice coil being electrically connected to the second electrical connecting member.

17. The double-sided speaker according to claim 16, wherein the position of the first electrical connecting member on the first bracket corresponds to the position of the second electrical connecting member on the second bracket.

18. The double-sided speaker according to claim 1, wherein the first voice coil surrounds the first magnetic circuit by a gap distance; the second voice coil surrounds the second magnetic circuit by a gap distance.

19. The double-sided speaker according to claim 1, wherein the sidewall and the bottom plate are integrally formed to one piece.

20. The double-sided speaker according to claim 1, wherein the first accommodating space is communicating with the second accommodating space through a front end and a rear end of the magnetic conductive carrying plate.

21. A double-sided speaker, comprising: a magnetic conductive carrying plate comprising a first magnetic conductive carrying plate and a second magnetic conductive carrying plate, the first magnetic conductive carrying plate comprising two first sidewalls and a first bottom plate, the two first sidewalls being disposed at two sides of the first bottom plate, the second magnetic conductive carrying plate comprising two second sidewalls and a second bottom plate, the two second sidewalls being disposed at two sides of the second bottom plate; wherein the first bottom plate and the second bottom plate form one plane; the two first sidewalls extend toward an upper area of the second bottom plate; the two second sidewalls extend toward a lower area of the first bottom plate; a first magnetic circuit disposed at one side of the magnetic conductive carrying plate; a second magnetic circuit disposed at another side of the magnetic conductive carrying plate; a first voice coil disposed between the first magnetic circuit and the two first sidewalls; a second voice coil disposed between the second magnetic circuit and the two second sidewalls; a first vibrating disposed at one side of the magnetic conductive carrying plate and comprising a first accommodating space in which the first magnetic circuit and the first voice coil being disposed; and a second vibrating disposed at another side of the magnetic conductive carrying plate and comprising a second accommodating space in which the second magnetic circuit and the second voice coil being disposed, the second accommodating space being communicating with the first accommodating space; wherein, the overall height of the two first sidewalls and the two second sidewalls are greater than or equal to the overall height of the first magnetic circuit and/or the second magnetic circuit.

22. The double-sided speaker according to claim 21, wherein the first vibrating comprises a first bracket and a first diaphragm; the first bracket is disposed on the two first sidewalls of the first magnetic conductive carrying plate; the first diaphragm is disposed at one side of the first bracket away from the two first sidewalls and is connected to the first voice coil; the second vibrating comprises a second bracket and a second diaphragm; the second bracket is disposed at the two second sidewalls of the second magnetic conductive carrying plate; the second diaphragm is disposed at one side of the second bracket away from the two second sidewalls and is connected to the second voice coil.

23. The double-sided speaker according to claim 22, wherein the first magnetic circuit further comprises a first magnet and a first magnetic conductive plate; the first magnet is disposed on a side surface of the first bottom plate and a side surface of the second bottom plate; the first magnetic conductive plate is disposed at one side of the first magnet away from the first bottom plate and the second bottom plate; the second magnetic circuit further comprises a second magnet and a second magnetic conductive plate; the second magnet is disposed on another side surface of the first bottom plate and another side surface of the second bottom plate; the second magnetic conductive plate is disposed at one side of the second magnet away from the first bottom plate and the second bottom plate.

24. The double-sided speaker according to claim 23, wherein the height of each of the first sidewalls and the height of each of the second sidewalls are greater than the height of the first magnet or/and the height of the second magnet.

25. The double-sided speaker according to claim 23, wherein the first bracket comprises a first mating; the second bracket comprises a second mating; the first mating and the second mating are oppositely disposed and are mutually connected.

26. The double-sided speaker according to claim 21, wherein the magnetic conductive carrying plate further comprises a plurality of communication holes disposed on the first bottom plate and the second bottom plate; the plurality of communication holes are disposed between and communicating with the first accommodating space and the second accommodating space; the plurality of communication holes are arranged along the arrangement direction of the first sidewall and the second sidewall.

27. The double-sided speaker according to claim 22 comprising a first electrical connecting member and a second electrical connecting member, the first electrical connecting member being disposed at the first bracket and being exposed from an outer surface of the first bracket, the first voice coil being electrically connected to the first electrical connecting member, the second electrical connecting member being disposed at the second bracket and being exposed from an outer surface of the second bracket, the second voice coil being electrically connected to the second electrical connecting member.

28. The double-sided speaker according to claim 27, wherein the position of the first electrical connecting member on the first bracket corresponds to the position of the second electrical connecting member on the second bracket.

29. The double-sided speaker according to claim 21, wherein the first voice coil surrounds the first magnetic circuit by a gap distance; the second voice coil surrounds the second magnetic circuit by a gap distance.

30. The double-sided speaker according to claim 21, wherein the first accommodating space is communicating with the second accommodating space through a front end and a rear end of the magnetic conductive carrying plate.

* * * * *